(12) United States Patent
Kobayashi et al.

(10) Patent No.: US 10,619,070 B2
(45) Date of Patent: Apr. 14, 2020

(54) COATING LIQUID, COATING FILM, AND COMPOSITE MATERIAL

(71) Applicant: DAINICHISEIKA COLOR & CHEMICALS MFG. CO., LTD., Tokyo (JP)

(72) Inventors: Nobuyuki Kobayashi, Tokyo (JP); Takanori Sannan, Tokyo (JP)

(73) Assignee: DAINICHISEIKA COLOR & CHEMICALS MFG. CO., LTD., Tokyo (JP)

( * ) Notice: Subject to any disclaimer, the term of this patent is extended or adjusted under 35 U.S.C. 154(b) by 391 days.

(21) Appl. No.: 15/502,121

(22) PCT Filed: Aug. 11, 2015

(86) PCT No.: PCT/JP2015/072769
§ 371 (c)(1),
(2) Date: Feb. 6, 2017

(87) PCT Pub. No.: WO2016/031562
PCT Pub. Date: Mar. 3, 2016

(65) Prior Publication Data
US 2017/0226365 A1 Aug. 10, 2017

(30) Foreign Application Priority Data

Aug. 26, 2014 (JP) ................. 2014-171188

(51) Int. Cl.
| | | |
|---|---|---|
| C09D 127/16 | (2006.01) | |
| C09D 7/65 | (2018.01) | |
| C09D 7/61 | (2018.01) | |
| C09D 7/20 | (2018.01) | |
| C09D 7/40 | (2018.01) | |
| C09D 7/63 | (2018.01) | |
| B32B 27/30 | (2006.01) | |
| C09D 101/08 | (2006.01) | |
| C09D 103/04 | (2006.01) | |
| C09D 105/08 | (2006.01) | |
| C09D 129/04 | (2006.01) | |
| H01G 11/28 | (2013.01) | |
| H01G 11/68 | (2013.01) | |
| H01G 11/70 | (2013.01) | |
| H01M 4/66 | (2006.01) | |
| C09D 5/24 | (2006.01) | |

(52) U.S. Cl.
CPC ............ *C09D 127/16* (2013.01); *B32B 27/30* (2013.01); *C09D 5/24* (2013.01); *C09D 7/20* (2018.01); *C09D 7/40* (2018.01); *C09D 7/61* (2018.01); *C09D 7/63* (2018.01); *C09D 7/65* (2018.01); *C09D 101/08* (2013.01); *C09D 103/04* (2013.01); *C09D 105/08* (2013.01); *C09D 129/04* (2013.01); *H01G 11/28* (2013.01); *H01G 11/68* (2013.01); *H01G 11/70* (2013.01); *H01M 4/661* (2013.01); *H01M 4/667* (2013.01); *H01M 4/668* (2013.01); *Y02E 60/13* (2013.01)

(58) Field of Classification Search
CPC .......... C09D 127/16; C09D 7/65; C09D 7/61; C09D 7/20; C09D 7/40; C09D 7/63; C09D 5/24; C09D 101/08; C09D 103/04; C09D 105/08; C09D 129/04; B32B 27/30; H01G 11/28; H01G 11/68; H01G 11/70; H01M 4/661; H01M 4/667; H01M 4/668; Y02E 60/13
USPC ........................................ 429/213
See application file for complete search history.

(56) References Cited

U.S. PATENT DOCUMENTS

| | | |
|---|---|---|
| 9,359,508 B2 | 6/2016 | Kobayashi et al. |
| 2009/0123839 A1 | 5/2009 | Soma et al. |
| 2009/0257171 A1 | 10/2009 | Yamazaki et al. |
| 2010/0028773 A1 | 2/2010 | Hirota et al. |
| 2010/0233532 A1 | 9/2010 | Hirota et al. |
| 2011/0091771 A1 | 4/2011 | Sannan et al. |
| 2012/0148917 A1 | 6/2012 | Kobayashi et al. |
| 2012/0156562 A1 | 6/2012 | Kobayashi et al. |
| 2012/0156563 A1 | 6/2012 | Kobayashi et al. |

(Continued)

FOREIGN PATENT DOCUMENTS

| | | |
|---|---|---|
| CN | 102498175 | 6/2012 |
| EP | 2068385 | 6/2013 |

(Continued)

OTHER PUBLICATIONS

JP 5472091B—machine translation (Year: 2014).*
Korean Office Action, issued in the corresponding Korean patent application No. 10-2017-7007834, dated Mar. 18, 2019, 9 pages, with machine translation.
International Search Report, issued in the corresponding International Application No. PCT/JP2015/072769, dated Oct. 13, 2015, 5 pages.

(Continued)

*Primary Examiner* — Ling Siu Choi
*Assistant Examiner* — Ronald Grinsted
(74) *Attorney, Agent, or Firm* — Hamre, Schumann, Mueller & Larson, P.C.

(57) ABSTRACT

There is provided a coating liquid capable of forming a coating film that is excellent in adhesiveness to the surface of a base material such as a metal, glass, or a resin even though the coating film contains PVDF which exhibits a remarkable non-tackiness and that can exhibit various desired functionalities such as non-tackiness, an antifouling property, chemical resistance, a sliding property, water repellency, electrical conductivity, an antifungal/antimicrobial property, and a deodorizing property. The coating liquid contains a polar solvent such as N,N-dimethylformamide or N-methyl-2-pyrrolidone, a hydrophilic polymer such as a chitosan derivative or a cellulose derivative, and polyvinylidene fluoride.

18 Claims, No Drawings

(56) References Cited

U.S. PATENT DOCUMENTS

| | | | |
|---|---|---|---|
| 2012/0160128 A1 | 6/2012 | Kobayashi et al. | |
| 2013/0320271 A1 | 12/2013 | Yamazaki et al. | |
| 2015/0147648 A1 | 5/2015 | Sannan et al. | |
| 2016/0244620 A1 | 8/2016 | Kobayashi et al. | |

FOREIGN PATENT DOCUMENTS

| | | | |
|---|---|---|---|
| EP | 2838145 A1 * | 2/2015 | ............ H01M 4/661 |
| JP | 10-329280 | 12/1998 | |
| JP | 2000-280402 | 10/2000 | |
| JP | 2001-181862 | 7/2001 | |
| JP | 2004-067716 | 3/2004 | |
| JP | 2004-071517 | 3/2004 | |
| JP | 2004-071518 | 3/2004 | |
| JP | 2004-363018 | 12/2004 | |
| JP | 2005-239929 | 9/2005 | |
| JP | 2005-246923 | 9/2005 | |
| JP | 2007-234277 | 9/2007 | |
| JP | 2008-060060 | 3/2008 | |
| JP | 4240157 | 3/2009 | |
| JP | 2009-123463 | 6/2009 | |
| JP | 2010-045341 | 2/2010 | |
| JP | 2010-061932 | 3/2010 | |
| JP | 2010-061996 | 3/2010 | |
| JP | 2010-144291 | 7/2010 | |
| JP | 5454725 | 3/2014 | |
| JP | 5472091 B2 * | 4/2014 | .............. H01B 3/32 |
| JP | 2014-095081 | 5/2014 | |
| KR | 10-2011-0015038 | 2/2011 | |
| WO | 2009/116393 | 9/2009 | |
| WO | 2009/147989 | 12/2009 | |
| WO | 2011/024797 | 3/2011 | |
| WO | WO2013/153916 | 10/2013 | |
| WO | WO-2013153916 A1 * | 10/2013 | ............ H01M 4/661 |
| WO | 2014/046077 | 3/2014 | |

OTHER PUBLICATIONS

Katsurao et al., "Battery Technology", vol. 12, p. 108, 2000.

Extended European Search Report, issued in the corresponding European application No. 15834855.7, dated Feb. 6, 2018, 9 pages.

Chinese Office Action issued in the corresponding Chinese patent application No. 201580045528.3, dated Jul. 23, 2018, 22 pages, with machine translation.

Notice of Opposition, issued in the Japanese Opposition No. 2018-700026-01, dated Feb. 15, 2018, 38 pages.

Notice of Opposition, issued in the Japanese Opposition No. 2018-700026-02, dated Feb. 15, 2018, 43 pages.

Chemical Dictionary 5, p. 624 of of Kagaku Daijiten Encyclopedia, 1963, 3 pages (partial machine translation is enclosed).

Korean Office Action, issued in the corresponding Korean patent application No. 10-2017-7007834, dated Sep. 11, 2018, 11 pages, with machine translation.

Third Korean Office Action, issued in the corresponding Korean patent application No. 10-2017-7007834, dated Sep. 18, 2019, 4 pages, the cited references that are not included in this IDS being previously submitted in the IDS.

* cited by examiner

COATING LIQUID, COATING FILM, AND COMPOSITE MATERIAL

TECHNICAL FIELD

The present invention relates to: a coating liquid capable of forming a coating film that is excellent in adhesiveness to the surface of a base material such as a metal, glass, or a resin, and other properties; a coating film formed using the coating liquid and a process for forming the coating film; a composite material, a member for an electrode plate, an electrode plate for an electrical storage apparatus and a production process thereof; and an electrical storage apparatus.

BACKGROUND ART

In recent years, the surface treatment technique using a fluororesin has been extensively utilized. Fluororesins exhibit various properties such as non-tackiness, heat resistance, oxidation resistance, weather resistance, chemical resistance, sliding properties, water/oil repellency, and electrical properties because of their characteristic structures. Utilization of various functionalities of a coating film formed using a functional coating liquid such as a solution, slurry, or paste (hereinafter, also together written as "slurry") containing a fluororesin has been studied in order to exhibit these properties in various fields such as paints, inks, coating agents, covering materials, building materials, kitchenware, household utensils, OA apparatuses, automobiles, medical treatment, electronic materials, semiconductors, liquid crystals, home electrical appliances, and electrical storage apparatuses.

Polyvinylidene fluoride (hereinafter, also written as "PVDF") is generally used in consideration of its coating applicability and the like as a fluororesin for use in coating liquids and coating agents. One of the properties that a coating film should have is an excellent adhesiveness to a base material. This is because it is when the adhesiveness to the base material is excellent that the functionalities of the coating film are fully exhibited. However, PVDF shows non-tackiness to general base materials, and therefore use of a coating liquid that merely contains PVDF results in an insufficient adhesiveness of the coating film to be formed to abase material. Accordingly, there are various proposals to improve adhesiveness of a coating film containing PVDF to a base material.

For example, in the field of paints for exterior building materials, there is a proposal in which a coating film is formed blending an acrylic resin with PVDF, and then a film or another coating film is further laminated on the coating film (Patent Literatures 1 and 2). Moreover, it is proposed to use a modified fluororesin obtained by introducing a functional group or a modified substance by which an effect of improving adhesiveness is expected into a basic repeating unit (Patent Literature 3 and 4).

On the other hand, in the field of batteries, PVDF is widely used as a binder for binding active materials in a lithium ion battery, and a solution of a binder, the solution obtained by dissolving PVDF in an NMP solution, is generally used as a dispersion medium. The amorphous moiety of PVDF suitably functions as a matrix for a polar solvent or an electrolyte in an electrolytic solution, and PVDF does not completely obstruct diffusion of lithium ions (Non Patent Literature 1). However, when an electrode is prepared using a solution of a binder, the solution obtained by dissolving PVDF in an NMP solution, the binding force of active materials may be insufficient. Therefore, various measures to improve the binding force of active materials have been studied.

For example, there is proposed an electrode obtained by binding primary particles of a positive electrode active material with a water-soluble polymeric binder and binding secondary particles, or a secondary particle and a collector with a fluororesin-based binder or a rubber-based binder (Patent Literature 5). Moreover, it is proposed to use a modified PVDF obtained by subjecting PVDF to partial dehydrofluorination with an alkali and thereafter further subjecting the treated PVDF to oxidation treatment with an oxidizing agent (Patent Literatures 6 and 7).

CITATION LIST

Patent Literature

Patent Literature 1: Japanese Patent Laid-Open No. 2000-280402
Patent Literature 2: Japanese Patent Laid-Open No. 2005-246923
Patent Literature 3: Japanese Patent Laid-Open No. 10-329280
Patent Literature 4: Japanese Patent Laid-Open No. 2004-067716
Patent Literature 5: Japanese Patent Laid-Open No. 2007-234277
Patent Literature 6: Japanese Patent Laid-Open No. 2004-071517
Patent Literature 7: Japanese Patent Laid-Open No. 2004-071518

Non Patent Literature

Non Patent Literature 1: Takumi Katsurao, Azusa Kurihara, and Aisaku Nagai; "PVDF-Based Battery Materials", Battery Technology, 12, 108(2000)

SUMMARY OF INVENTION

Technical Problem

However, there have been various problems to be solved even in the methods proposed in the Patent Literatures and the like. For example, in the case of the methods proposed in Patent Literatures 1 and 2, there has been a problem that the application is limited to painting for baking finish of metals at a factory because a heating/melting step is essential. Moreover, in the methods proposed in Patent Literatures 3 and 4, there has been a problem that a material-preparing step being a pre-step of a step of applying a coating liquid becomes complicated. Furthermore, in the methods proposed in Patent Literatures 5 to 7, there has been a problem that the number of treatment steps becomes large to make a step of preparing an electrode complicated.

The present invention has been made in consideration of the problems of the conventional techniques, and the present invention intends to provide a coating liquid capable of forming a coating film that is excellent in adhesiveness to the surface of a base material such as a metal, glass, or a resin even though the coating film contains PVDF which exhibits a remarkable non-tackiness and that can exhibit desired various functionalities such as non-tackiness, an antifouling property, chemical resistance, a sliding property, water repellency, electrical conductivity, an antifungal/antimicrobial property, and a deodorizing property. The present invention also intends to provide: a coating film formed using the coating liquid and a process for forming the coating film; a composite material, a member for an electrode plate, and an electrode plate for an electrical storage apparatus and a production process thereof; and an electrical storage apparatus.

Solution to Problem

That is, according to the present invention, a coating liquid shown below is provided.

[1] A coating liquid containing: a polar solvent; a hydrophilic polymer; and polyvinylidene fluoride.

[2] The coating liquid according to [1], wherein the polar solvent is at least one selected from the group consisting of N,N-dimethylformamide, N,N-dimethylacetoamide, N-methyl-2-pyrrolidone, N-ethyl-2-pyrrolidone, and β-alkoxypropionamides.

[3] The coating liquid according to [1] or [2], wherein the hydrophilic polymer is at least one selected from the group consisting of chitosan derivatives, cellulose derivatives, starch derivatives, unmodified polyvinyl alcohols, and modified polyvinyl alcohols.

[4] The coating liquid according to [3], wherein: the chitosan derivative is at least one hydroxyalkyl chitosan selected from the group consisting of hydroxyethyl chitosan, hydroxypropyl chitosan, hydroxybutyl chitosan, and dihydroxypropyl chitosan; the cellulose derivative is at least one selected from the group consisting of hydroxyethyl cellulose, hydroxypropyl cellulose, methyl cellulose, hydroxyethyl methyl cellulose, and hydroxypropyl methyl cellulose; the starch derivative is at least one selected from the group consisting of hydroxyethyl starch, hydroxypropyl starch, and hydroxybutyl starch; the unmodified polyvinyl alcohol has a degree of saponification of 98 mol % or less; and the modified polyvinyl alcohol is at least one selected from the group consisting of carboxy group-modified polyvinyl alcohols, carbonyl group-modified polyvinyl alcohols, silanol group-modified polyvinyl alcohols, amino group-modified polyvinyl alcohols, cationically modified polyvinyl alcohols, sulfonate group-modified polyvinyl alcohols, and acetoacetyl group-modified polyvinyl alcohols.

[5] The coating liquid according to any one of [1] to [4], further containing a polybasic acid.

[6] The coating liquid according to any one of [1] to [5], further containing at least one electrically conductive material selected from the group consisting of acetylene black, Ketjen black, graphite, furnace black, single layer carbon nanofibers, multilayer carbon nanofibers, single layer carbon nanotubes, multilayer carbon nanotubes, and graphene.

Moreover, according to the present invention, a coating film and a process for forming the coating film, shown below, are provided.

[7] A coating film formed using the coating liquid according to any one of [1] to [6].

[8] The coating film according to [7], having a contact angle of 70° or more measured in accordance with JIS R 3257.

[9] A process for forming a coating film, the process including a step of heating the coating liquid according to any one of [1] to [6] to a temperature of 80° C. or higher.

Further, according to the present invention, a composite material shown below is provided.

[10] A composite material containing: a base material; and the coating film according to [7] or [8] disposed on the base material integrally therewith.

[11] The composite material according to [10], wherein the base material is at least one selected from the group consisting of metals, glass, natural resins, synthetic resins, ceramics, wood, paper, fibers, nonwoven fabrics, woven fabrics, and leather.

Furthermore, according to the present invention, a member for an electrode plate, shown below, is provided.

[12] A member for an electrode plate, containing: a collector; and a coating film being disposed on a surface of the collector and comprising the coating liquid according to [6].

Still further, according to the present invention, an electrode plate for an electrical storage apparatus and a production process thereof, and an electrical storage apparatus, shown below, are provided.

[13] An electrode plate for an electrical storage apparatus, the electrode plate containing: the member for an electrode plate according to [12]; and an electrode layer disposed on a surface of the coating film constituting the member for an electrode plate.

[14] The electrode plate for an electrical storage apparatus according to [13], wherein: the collector constituting the member for an electrode is aluminum foil; and the electrode layer comprises a positive electrode active material.

[15] The electrode plate for an electrical storage apparatus according to [13], wherein: the collector constituting the member for an electrode is copper foil; and the electrode layer comprises a negative electrode active material.

[16] The electrode plate for an electrical storage apparatus according to [13], wherein: the collector constituting the member for an electrode is aluminum foil; and the electrode layer is a polarizable electrode.

[17] A process for producing an electrode plate for an electrical storage apparatus, the process including a step of applying the coating liquid according to [6] on a surface of a collector to form a coating film and thereafter forming an electrode layer on a surface of the coating film.

[18] An electrical storage apparatus including the electrode plate for an electrical storage apparatus according to any one of [13] to [16].

[19] The electrical storage apparatus according to [18], being a secondary battery or a capacitor.

Advantageous Effects of Invention

The present invention can provide a coating liquid capable of forming a coating film that is excellent in adhesiveness to the surface of a base material such as a metal, glass, or a resin although the coating film contains PVDF which exhibits a remarkable non-tackiness and that can exhibit desired various functionalities such as non-tackiness, an antifouling property, chemical resistance, a sliding property, water repellency, electrical conductivity, an antifungal/antimicrobial property, and a deodorizing property. The present invention can also provide: a coating film formed using the coating liquid and a process for forming the coating film; a composite material, a member for an electrode plate, and an electrode plate for an electrical storage apparatus and a production process thereof; and an electrical storage apparatus.

By use of the coating liquid according to the present invention, a coating film to which various functions such as electrical conductivity and water repellency are imparted and a composite material having a coating film to which such functions are imparted can be produced. Moreover, in the coating liquid according to the present invention, a moderate viscosity is maintained even after storage for a long period of time and, even in the case of containing a filler such as an electrically conductive material, the filler is hard to settle and separate. Therefore, by use of the coating liquid according to the present invention, an electrically conductive coating film (thin film) to be an undercoat layer that is excellent in adhesiveness and electrolytic solution-resistance and that has an improved contact resistance with a collector can also be formed between a collector such as aluminum foil or copper foil and an electrode layer. Accordingly, by use of the coating liquid according to the present invention, an electrode plate for an electrical storage apparatus such as a battery or a capacitor, the electrode plate being excellent in various properties, and an electrical storage apparatus provided with the electrode plate for an electrical storage apparatus can be provided.

Furthermore, other than the electrical storage apparatus and the like, utilization of the coating liquid according to the present invention in many industrial fields such as, for example, paints for electronic materials, inks, toners, rubber, plastics, ceramics, magnetic substances, adhesives, and color filters for liquid crystals is expected.

DESCRIPTION OF EMBODIMENTS

<Coating Liquid>

Hereinafter, the embodiments according to the present invention will be described; however, the present invention is not limited to the following embodiments. As a result of diligent studies, the present inventors have completed the present invention by finding that when a hydrophilic polymer and polyvinylidene fluoride (PVDF) are contained in a polar solvent, the functionalities that originates from a fluororesin, such as non-tackiness and water repellency, and the adhesiveness to base materials can be secured. That is, the coating liquid according to the present invention contains: a polar solvent; a hydrophilic polymer having hydrophilicity together with the binding property and dispersability to fillers such as electrically conductive materials; and PVDF.

In the coating film formed using the coating liquid according to the present invention, a concentration gradient occurs for each component. Specifically, the existence ratio of the hydrophilic polymer becomes relatively large in the lower layer (a layer making contact with a base material) in the coating film, so that the adhesiveness with the base material is exhibited. Moreover, the existence ratio of PVDF becomes relatively large in the upper layer (surface layer (a layer on the opposite side of the base material from the lower layer)) in the coating layer, so that the non-tackiness, water repellency, chemical resistance, and the like are exhibited. Besides, both the concentration gradients of the two components, the hydrophilic polymer and PVDF, are continuous, and therefore an interface never appears between the two components and the possibility that interfacial peeling occurs is extremely low.

(Hydrophilic Polymer)

The coating liquid according to the present invention contains a hydrophilic polymer. The hydrophilic polymer is a polymer having a hydrophilic functional group such as a hydroxy group or a carboxy group within the molecular structure thereof. Specific examples of the hydrophilic polymer include chitosan derivatives, cellulose derivatives, starch derivatives, unmodified polyvinyl alcohols, and modified polyvinyl alcohols.

The chitosan derivatives are preferable because the solubility to organic solvents is satisfactory. Commercially available chitosan derivatives can be used as they are. Specific examples of the chitosan derivative include hydroxyalkyl chitosans, carboxyalkyl chitosans, carboxyacyl chitosans, succinyl chitosan, and cationized chitosans. Among them, hydroxyalkyl chitosans, carboxyalkyl chitosans, and carboxyacyl chitosans are preferable.

The hydroxyalkyl chitosan is a natural polymer of biological origin and has less environmental load. As a hydroxyalkyl chitosan, hydroxyethyl chitosan, hydroxypropyl chitosan, hydroxybutyl chitosan, hydroxybutyl hydroxypropyl chitosan, and dihydroxypropyl chitosan are preferable.

The hydroxyalkyl chitosan can be produced, for example, by reacting an amino group in chitosan with an alkylene oxide or oxiranemethanol. However, a hydroxyalkyl chitosan produced by another method can also be used. Moreover, the hydroxyalkyl chitosan may be a hydroxyalkyl chitosan produced by mixing an alkylene oxide and oxiranemethanol to react with an amino group in the chitosan.

For example, hydroxybutyl chitosan can be obtained in such a way that chitosan is stirred and dispersed in a medium such as water-containing isopropyl alcohol, and sodium hydroxide and butylene oxide are then added to the resultant mixture to conduct heating and stirring subsequently. Moreover, dihydroxypropyl chitosan can be obtained in such a way that chitosan is stirred and dispersed in a medium such as water-containing isopropyl alcohol, and oxiranemethanol is then added to the resultant mixture to conduct heating and stirring subsequently.

When the coating liquid according to the present invention further contains an electrically conductive material being a filler, it is preferable that the degree of hydroxyalkylation of the hydroxyalkyl chitosan be 0.5 to 4. By use of the hydroxyalkyl chitosan having a degree of hydroxyalkylation within the range, the dispersibility of the electrically conductive material can be improved. When the degree of hydroxyalkylation of the hydroxyalkyl chitosan is less than 0.5, the dispersibility of a filler and the stability of slurry (coating liquid) may be insufficient. On the other hand, the dispersibility of a filler does not change even if the degree of hydroxyalkylation of the hydroxyalkyl chitosan exceeds 4, and therefore there is a tendency that such a case becomes uneconomical.

The term "degree of hydroxyalkylation (not having a unit)" means the addition rate of an alkylene oxide or oxiranemethanol to chitosan. That is, "a degree of hydroxyalkylation of 0.5 to 4" means that 0.5 to 4 mol of the alkylene oxide or oxiranemethanol is added per one (1 mol) pyranose ring that constitutes chitosan. To obtain a hydroxyalkyl chitosan having a degree of hydroxyalkylation within the range, 0.6 to 10 mol of the alkylene oxide or oxiranemethanol per one (1 mol) pyranose ring that constitutes chitosan may be reacted with chitosan.

It is preferable that the weight average molecular weight of the hydroxyalkyl chitosan be 2,000 to 350,000, and more preferably 5,000 to 250,000. When the weight average molecular weight of the hydroxyalkyl chitosan is lower than 2,000, the strength of a coating film may be insufficient. On the other hand, when the weight average molecular weight of the hydroxyalkyl chitosan exceeds 350,000, there is a tendency that the viscosity of a coating liquid is liable to increase to make it difficult to raise the solid concentration of a filler such as an electrically conductive material.

It is preferable that the content of the chitosan derivative in the coating liquid be 0.1 to 40 parts by mass when the total amount of the coating liquid is assumed to be 100 parts by mass, and more preferably 0.5 to 20 parts by mass.

The cellulose derivatives are preferable because they are hydrophilic polymers that are excellent in safety. Commercially available cellulose derivatives can be used as they are, and may be used alone or in the form of a mixture. Specific examples of the cellulose derivative include methyl cellulose, ethyl cellulose, butyl cellulose, carboxymethyl cellulose, hydroxymethyl cellulose, hydroxyethyl cellulose, hydroxypropyl cellulose, hydroxyethyl methyl cellulose, hydroxypropyl methyl cellulose, cellulose acetate, alkali celluloses, viscoses, cellulose sulfate, cellulose fatty acid esters, and cationized celluloses. Among them, hydroxyethyl cellulose, hydroxypropyl cellulose, methyl cellulose, hydroxyethyl methyl cellulose, and hydroxypropyl methyl cellulose are preferable.

It is preferable that the content of the cellulose derivative in the coating liquid be 0.1 to 40 parts by mass when the total amount of the coating liquid is assumed to be 100 parts by mass, and more preferably 0.5 to 20 parts by mass.

The starch derivatives are preferable because they are hydrophilic polymers that are excellent in safety. Commercially available starch derivatives can be used as they are, and may be used alone or in the form of a mixture. Specific examples of the starch derivative include hydroxyethyl starch, hydroxypropyl starch, hydroxybutyl starch, carboxymethyl starch, and cationized starches. Among them, hydroxyethyl starch, hydroxypropyl starch, and hydroxybutyl starch are preferable.

It is preferable that the content of the starch derivative in the coating liquid be 0.1 to 40 parts by mass when the total amount of the coating liquid is assumed to be 100 parts by mass, and more preferably 0.5 to 20 parts by mass.

The polyvinyl alcohol (hereinafter, also written as "PVA") may be modified PVAs or unmodified PVAs. The PVAs can be used alone or in combination of two or more. The PVAs are preferable because they are hydrophilic polymers having less environmental load.

The unmodified PVA is a publicly known resin obtained by saponifying polyvinyl acetate. It is preferable that the degree of saponification of the unmodified PVA be 98% or less, and more preferably 70 to 98%. In addition, there is a tendency that the unmodified PVA having a degree of saponification of exceeding 98% and 100% or less is hard to dissolve uniformly in polar solvents. Moreover, it is preferable that the unmodified PVA have a degree of polymerization of 300 to 5,000 and also have a degree of saponification of 70 to 98%. As such an unmodified PVA, products sold on the market such as, for example, trade name "KURARAY POVAL" (manufactured by Kuraray Co., Ltd.), trade name "GOHSENOL" (manufactured by The Nippon Synthetic Chemical Industry Co., Ltd), trade name "DENKA POVAL" (manufactured by Denka Company Limited), and trade name "J-POVAL" (manufactured by Japan VAM & Poval Co., Ltd.) can be obtained from the market and used.

The modified PVA is a hydrophilic polymer in which a functional group other than a hydroxy group and an acetate group is introduced into the unmodified PVA. Specific examples of the modified PVA include carboxy group-modified PVAs, carbonyl group-modified PVAs, silanol group-modified PVAs, amino group-modified PVAs, cationically modified PVAs, sulfonate group-modified PVAs, and acetoacetyl group-modified PVAs.

As a modified PVA, products sold on the market such as, for example, trade name "GOHSERAN" (sulfonate group-modified PVA), trade name "GOHSEFIMER K" (cationically modified PVA), trade name "GOHSEFIMER Z" (acetoacetyl group-modified PVA), and trade name "GOHSENAL" (carboxy group-modified PVA) (all manufactured by The Nippon Synthetic Chemical Industry Co., Ltd.); trade name "D Polymer" (carbonyl group-modified PVA) and trade name "A series" (carboxy group-modified PVAs) (all, Japan VAM & Poval Co., Ltd.); and trade name "KURARAY C-POLYMER" (cationically modified PVA) and trade name "KURARAY R POLYMER" (silanol-modified PVA) (all manufactured by Kuraray Co, Ltd.) can be purchased from the market and used.

It is preferable that the content of the PVA in the coating liquid be 1 to 40 parts by mass when the total amount of the coating liquid is assumed to be 100 parts by mass, and more preferably 1 to 20 parts by mass.

When a hydrophilic polymer having an appropriate function according to the field of use is selected and contained in the coating liquid according to the present invention, utilization of the coating liquid according to the present invention in various fields such as, for example, paints, inks, magnetic substances, ceramics, electrical storage apparatuses, adhesives, electronic materials, color filters for liquid crystals, medical products, cosmetic products, perfume, and building materials is expected as a coating liquid capable of forming a coating film that is excellent in adhesiveness to base materials and that exhibits functionalities specific to fluororesins such as non-tackiness, chemical resistance, heat resistance, and weather resistance. Moreover, when an electrically conductive material such as carbon black is contained in the coating liquid according to the present invention, the coating liquid can be used as an electrically conductive coating liquid capable of forming an undercoat layer or an electrode layer of a collector that constitutes an electrical storage apparatus such as a lithium ion secondary battery or a capacitor.

(Polyvinylidene Fluoride (PVDF))

The coating liquid according to the present invention contains polyvinylidene fluoride (PVDF). The PVDF is a fluorine-based resin obtained by emulsion polymerization or suspension polymerization of vinylidene fluoride. As PVDF, various grades such as trade name "KF polymer" (manufactured by Kureha Corporation) and trade name "Kynar" (manufactured by Arkema) can be purchased from the market and used.

It is preferable that the content of PVDF in the coating liquid be 0.02 to 40 parts by mass when the total amount of the coating liquid is assumed to be 100 parts by mass, and more preferably 0.02 to 20 parts by mass.

(Polar Solvent)

The coating liquid according to the present invention contains a polar solvent. Specific examples of the polar solvent include: amides such as formamide, N-methylformamide, N-ethylformamide, N,N-dimethylformamide, N,N-diethylformamide, vinylformamide, vinyl acetamide, acetamide, N-methylacetamide, N-ethylacetamide, N,N-dimethylacetamide, N,N-diethylacetamide, N-methyl-2-pyrrolidone, N-ethyl-2-pyrrolidone, vinylpyrrolidone, piperidone, N-methylpiperidone, N-ethylpiperidone, hexamethylphosphoric triamide, 1,3-dimethyl-2-imidazolidinone, methyloxazolidinone, ethyloxazolidinone, and β-alkoxypropionamides; alcohols such as methyl alcohol, ethyl alcohol, isopropyl alcohol, propyl alcohol, and butyl alcohol; carbonates such as ethylene carbonate, ethyl methyl carbonate, diethyl carbonate, dimethyl carbonate, propylene carbonate, and butylene carbonate; sulfoxides such as dimethyl sulfoxide; and sulfones such as tetramethylene sulfone.

Among the polar solvents, aprotic polar solvents such as N,N-dimethylformamide, N,N-dimethylacetamide, N-methyl-2-pyrrolidone, N-ethyl-2-pyrrolidone, and β-alkoxypropionamides are preferable. These polar solvents can be used alone or in combination of two or more. Moreover, as a polar solvent, a product sold on the market may be used as it is, or a purified product may be used when necessary.

(Polybasic Acid)

It is preferable that the coating liquid according to the present invention further contain a polybasic acid. As a polybasic acid, other than the polybasic acids themselves, acid anhydrides, salts of part or the whole of the carboxy groups, alkyl esters, amides, imides, amide-imides, and the like can be used. The salts of the carboxy group includes ammonium salts or amine salts. Moreover, a derivative or the like in which part or the whole of the carboxy groups of a polybasic acid are modified with N-hydroxysuccinimide, N-hydroxysulfosuccinimide, or a derivative thereof can also be used as a polybasic acid. In addition, as a derivative of the polybasic acid, a compound that produces a polybasic acid during heating when the coating film is formed is preferable.

Specific examples of the polybasic acid include dibasic acids, tribasic acids, tetrabasic acids, and hexabasic acids shown below. In addition, it is preferable to use derivatives of the polybasic acids shown below, particularly acid anhydrides of the polybasic acids shown below.

[Dibasic Acid] Oxalic acid, malonic acid, succinic acid, methylsuccinic acid, glutaric acid, methylglutaric acid, adipic acid, pimelic acid, suberic acid, azelaic acid, sebacic acid, maleic acid, methylmaleic acid, fumaric acid, methylfumaric acid, itaconic acid, muconic acid, citraconic acid, glutaconic acid, acetylenedicarboxylic acid, tartaric acid, malic acid, supiculisporic acid, glutamic acid, glutathione, aspartic acid, cystine, acetylcystine, diglycolic acid, iminodiacetic acid, hydroxyethyl iminodiacetic acid, thiodiglycolic acid, thionyldiglycolic acid, sulfonyldiglycolic acid, polyethylene oxide diglycolic acid (PEG acid), pyridinedicarboxylic acid, pyrazinedicarboxylic acid, epoxysuccinic acid, phthalic acid, isophthalic acid, terephthalic acid, tetrachlorophthalic acid, naphthalenedicarboxylic acid, tetrahydrophthalic acid, methyltetrahydrophthalic acid, cyclohexanedicarboxylic acid, diphenyl sulfone dicarboxylic acid, and diphenylmethane dicarboxylic acid.

[Tribasic Acid] Citric acid, 1,2,3-propanetricarboxylic acid, 1,2,4-butanetricarboxylic acid, 2-phosphono-1,2,4-butanetricarboxylic acid, trimellitic acid, and 1,2,4-cyclohexanetricarboxylic acid.

[Tetrabasic Acid] Ethylenediaminetetraacetic acid, 1,2,3,4-butanetetracarboxylic acid, pyromellitic acid, 1,2,4,5-cyclohexanetetracarboxylic acid, and 1,4,5,8-naphthalenetetracarboxylic acid.

[Hexabasic Acid] 1,2,3,4,5,6-cyclohexanehexacarboxylic acid.

In addition, an "additional polybasic acid" as shown below may be used together with the above-described polybasic acid. That is, specific examples of the "additional polybasic acid" include: tribasic acids such as isocitric acid, aconitic acid, nitrilotriacetic acid, hydroxyethyl ethylenediamine triacetic acid, carboxyethyl thiosuccinic acid, and trimesic acid; N,N'-ethylenediaminesuccinic acid; 1,4,5,8-naphthalenetetracarboxylic acid; penetenetetracarboxylic acid; hexenetetracarboxylic acid; glutamic acid diacetic acid; monocyclic tetracarboxylic acids such as maleated methylcyclohexenetetracarboxylic acid, furanetetracarboxylic acid, benzophenonetetracaboxylic acid, phthalocyanine tetracarboxylic acid, 1,2,3,4-cyclobutanetetracarboxylic acid, and cyclopentanetetracarboxylic acid; tetrabasic acids including multicyclic tetracarboxylic acids having a bicyclo ring, a norbornane ring, or a tetracyclo ring such as bicyclo[2,2,1]heptane-2,3,5,6-tetracarboxylic acid, and bicyclo[2,2,2]octane-2,3,5,6-tetracarboxylic acid; pentabasic acids such as diethylenetriaminepentaacetic acid; phthalocyanine polycarboxylic acid, phytic acid, hexametaphosphoric acid, polyphosphoric acid, polyacrylic acid, polymethacrylic acid, polyitaconic acid, polymaleic acid, and copolymers thereof; and styrene-maleic acid copolymers, isobutylene-maleic acid copolymers, vinyl ether-maleic acid copolymers, pectic acid, polyglutamic acid, polymalic acid, polyaspartic acid, and acrylic acid-maleic acid-vinyl alcohol copolymers.

When a coating film is formed through heating and drying using the coating liquid containing a polybasic acid, the polybasic acid acts during heating and drying as a cross-linking agent for a hydrophilic polymer, PVDF, and an additional resin component that is arbitrarily added. Therefore, a coating film having extremely excellent adhesiveness to the surface of metallic materials or the collector that constitutes an electrical storage apparatus and having extremely excellent solvent resistance can be formed.

It is preferable that the content of the polybasic acid in the coating liquid be 0.01 to 40 parts by mass when the total amount of the coating liquid is assumed to be 100 parts by mass, and more preferably 0.01 to 20 parts by mass.

(Electrically Conductive Material)

It is preferable that the coating liquid according to the present invention further contain an electrically conductive material. Specific examples of the electrically conductive material include acetylene black, Ketjen black, graphite, furnace black, single layer carbon nanofibers, multilayer carbon nanofibers, single layer carbon nanotubes, multilayer carbon nanotubes, and graphene. When these electrically conductive materials are contained, the electrical contact property of a coating film (undercoat layer) formed on the surface of the collector that constitutes an electrical storage apparatus such as a lithium secondary battery or a capacitor is much more improved. That is, the electrical conductivity of the coating film is secured, and therefore the internal resistance of an electrode layer becomes small and the capacity density increases.

It is preferable that the content of the electrically conductive material in the coating liquid be 0.1 to 30 parts by mass when the total amount of the coating liquid is assumed to be 100 parts by mass, and more preferably 1 to 20 parts by mass.

(Content of Each Component)

It is preferable that the amount of each component contained in the coating liquid according to the present invention be in the following range when the total amount of the coating liquid is assumed to be 100 parts by mass. That is, it is preferable that the content of the hydrophilic polymer be 0.1 to 40 parts by mass, and more preferably 0.5 to 20 parts by mass. It is preferable that the content of PVDF be 0.02 to 40 parts by mass, and more preferably 0.02 to 20 parts by mass. It is preferable that the content of the polybasic acid be 0.01 to 40 parts by mass, and more preferably 0.01 to 20 parts by mass. It is preferable that the content of the electrically conductive material be 0.1 to 30 parts by mass, and more preferably 1 to 20 parts by mass. In addition, it is preferable that the solid content in the coating liquid be 1 to 35% by mass.

When the content of the hydrophilic polymer is less than 0.1 parts by mass, the strength and adhesiveness of a coating film to be formed is insufficient, so that components in the coating film are liable to drop out. On the other hand, when the content of the hydrophilic polymer exceeds 40 parts by mass, a uniform solution is not obtained. When the content of PVDF is less than 0.02 parts by mass, various functionalities at the surface of a coating film to be formed, such as non-tackiness and chemical resistance, is insufficient. On the other hand, when the content of PVDF exceeds 40 parts by mass, a uniform solution is not obtained.

When the content of the polybasic acid is less than 0.01 parts by mass, the extent of crosslink is liable to be insufficient and the crosslink density of a coating film to be formed may be lowered. Therefore, there is a tendency that the adhesiveness to base materials is also lowered, the insolubility to solvents is lowered, and non-swellability is lowered. On the other hand, when the content of the polybasic acid exceeds 40 parts by mass, there is a tendency that the flexibility of a coating film to be formed is lowered, and the coating film may be disadvantageous from the economical viewpoint. When the content of the electrically conductive material is less than 0.1 parts by mass, the electrical conductivity of a coating film to be formed may be insufficient. On the other hand, when the content of the electrically conductive material exceeds 30 parts by mass, the amount of the other components is relatively deficient, the performance of a coating film to be formed may be lowered.

In the case where the coating liquid according to the present invention is used as a coating liquid for forming an electrically conductive coating film on the surface of a collector, it is preferable that the content of the hydrophilic polymer be 1 to 15 parts by mass, the content of PVDF be 0.1 to 10 parts by mass, the content of the polybasic acid be 1 to 10 parts by mass, and the content of the electrically conductive material be 1 to 20 parts by mass based on 100 parts by mass of the total amount of the coating liquid. Moreover, in the case where the coating liquid according to the present invention is used as a coating liquid for forming a water-repellent coating film for an antifouling purpose to be provided on the surface of a ceramics or a metallic material, it is preferable that the content of the hydrophilic polymer be 0.1 to 15 parts by mass, the content of PVDF be 0.1 to 20 parts by mass, and the content of the polybasic acid be 0.1 to 10 parts by mass based on 100 parts by mass of the total amount of the coating liquid.

(Additional Resin Component)

When the properties such as physical strength, durability, wear resistance, and adhesiveness to base materials need to be imparted to a coating film to be formed, it is preferable to add as a binder a resin (additional resin component) other than the hydrophilic polymer to the coating liquid. Specific examples of the additional resin component include conventionally known resins such as polyvinyl acetals, fluorine-containing polymers (excluding PVDF), styrene-based polymers, polyamides, polyimides, and polyamide-imides. These resin components obtained from the market may be used as they are, and it is also preferable to use the derivatives thereof taking the solubility to solvents or the dispersibility to dispersion media into consideration.

It is preferable that the content of the additional resin component in the coating liquid be 10 to 2,000 parts by mass based on 100 parts by mass of the hydrophilic polymer, and more preferably 10 to 1,000 parts by mass. Moreover, it is preferable that the content of the additional resin component in the coating liquid be 1 to 40 parts by mass when the total amount of the coating liquid is assumed to be 100 parts by mass, and more preferably 5 to 20 parts by mass. In the case where the content of the additional resin component is less than 1 part by mass when the total amount of the coating liquid is assumed to be 100 parts by mass, the strength or the adhesiveness to base materials of the coating film to be formed may be liable to be insufficient and each component may be liable to drop out from the coating film. On the other hand, in the case where the content of the additional resin component exceeds 40 parts by mass when the total amount of the coating liquid is assumed to be 100 parts by mass, a uniform solution may be difficult to obtain. Moreover, in the case where the content of the additional resin component exceeds 40 parts by mass when the total amount of the coating liquid is assumed to be 100 parts by mass, and an electrically conductive material is contained, the fluidity of the coating liquid is lowered, and the electrically conductive material is completely covered by the additional resin component, so that there is a tendency that the electrical conductivity of the electrically conductive material is insufficiently exhibited.

When a coating film is formed using the coating liquid containing the additional resin component, the polybasic acid acts as a crosslinking agent for the hydrophilic polymer, PVDF, and the additional resin component during heating and drying. Therefore, a coating film having an excellent adhesiveness to the surface of base materials such as metallic materials or the like, solvent resistance, and water resistance can be formed.

In the case where the additional resin component is contained, it is preferable that the content of the polybasic acid in the coating liquid be 1 to 150 parts by mass per 100 parts by mass of the additional resin component, and more preferably 2 to 100 parts by mass. When the content of the polybasic acid is less than 1 part by mass per 100 parts by mass of the additional resin component, there is a tendency that the crosslinking density of the crosslinked polymer to be formed is lowered and the adhesiveness of the coating film to base materials is insufficient. Moreover, in the case where the coating liquid according to the present invention is used for a battery, when the content of the polybasic acid is less than 1 part by mass per 100 parts by mass of the additional resin component, the insolubility, non-swellability, electrochemical stability, and the like of a crosslinked polymer to be formed to electrolytic solutions may be insufficient. On the other hand, when the content of the polybasic acid exceeds 150 parts by mass per 100 parts by mass of the additional resin component, the flexibility of the coating film to be formed may be lowered, and there is a tendency that the coating liquid may become disadvantageous from the economical viewpoint.

(Crosslinking Agent)

The coating liquid according to the present invention can contain a crosslinking agent (excluding polybasic acids). Specific examples of the crosslinking agent include: epoxy compounds such as ethylene glycol diglycidyl ether, polyethylene glycol diglycidyl ether, and glycerol polyglycidyl ether; isocyanate compounds such as toluylene diisocyanate, xylylene diisocyanate, hexamethylene diisocyanate, and phenyl diisocyanate; blocked isocyanate compounds obtained by blocking the isocyanate compound with any of blocking agents such as phenols, alcohols, active methylenes, mercaptans, acid amides, an imides, amines, imidazoles, ureas, carbamic acid, imines, oximes, and sulfurous acid; aldehyde compounds such as glyoxal, glutaraldehyde, and dialdhehyde starch; (meth)acrylate compounds such as polyethylene glycol diacrylate, polyethylene glycol dimethacrylate, and hexanediol diacrylate; methylol compounds such as methylol melamine, and dimethylol urea; organic acid metal salts such as zirconyl acetate, zirconyl carbonate, and titanium lactate; metallic alkoxide compounds such as aluminum trimethoxide, aluminum tributoxide, titanium tetraethoxide, titanium tetrabutoxide, zirconium tetrabutoxide, aluminum dipropoxide acethyl acetonate, titanium dimethoxide bis(acetyl acetonate), and titanium dibutoxide bis (ethyl acetoacetate); silane coupling agents such as vinyl methoxysilane, vinyl ethoxysilane, 3-glycidoxypropyltrimethoxysilane, 3-glycidoxypropyltriethoxysilane, 3-methacryloxypropyltrimethoxysilane, 3-aminopropyltrimethoxysilane, 3-aminopropyltriethoxysilane, 3-isocyanate-propyltriethoxysilane, and imidazole silane; silane compounds such as methyltrimethoxysilane, tetraethoxysilane, and methyltriethoxysilane; and carbodiimide compounds.

It is preferable that the content of the crosslinking agent in the coating liquid be 0.01 to 200% by mass based on the total amount of the hydrophilic polymer, PVDF, and the additional resin component.

(Method for Preparing Coating Liquid)

In the case where the coating liquid according to the present invention is a solution that does not contain an electrically conductive material, the coating liquid according to the present invention can be prepared in such a way that a hydrophilic polymer and PVDF, and a polybasic acid, etc. to be added when necessary are added and dissolved in a polar solvent. When dissolving the respective components in the polar solvent, the order of adding the respective components to the polar solvent is arbitrary. Moreover, stirring under room temperature is sufficient; however, stirring under a heating condition may be conducted when necessary.

In the case where the coating liquid according to the present invention is a coating liquid in a dispersed state, the coating liquid according to the present invention can be prepared in such a way that a hydrophilic polymer and PVDF, and a polybasic acid, etc. to be added when necessary are added to a polar solvent and then mixed and dispersed using a mixer. As a mixer, a ball mill, a sand mill, a pigment disperser, a mash crushing machine, an ultrasonic disperser, a homogenizer, a planetary mixer, a Hobart mixer, and the like can be used. Moreover, it is also preferable that the electrically conductive material be mixed with the polar solvent in advance using a mixer such as a mash crushing machine, a planetary mixer, a Henschel mixer, or an omni-mixer, and thereafter the hydrophilic polymer, PVDF, and the additional, arbitrary component be added thereto to mix the resultant mixture uniformly. By these methods, a uniform coating liquid can easily be prepared.

<Coating Film and Method for Forming Same>

The coating film according to the present invention is formed using the coating liquid. For example, the coating film can be formed by applying the coating liquid on the surface of a base material to form an applied film and then drying the applied film that has been formed. The amount of the coating liquid applied on the surface of the base material is not particularly limited, and may be an amount such that the thickness of the coating film to be formed is usually 0.05 to 100 µm, and preferably 0.1 to 50 µm. Examples of the base material include metals such as aluminum, copper, nickel, and stainless steel, glass, natural resins, synthetic resins, ceramics, wood, paper, fiber, nonwoven fabrics, woven fabrics, and leather. When producing a member for an electrode plate that constitutes an electrical storage apparatus, it is preferable to use a collector such as aluminum foil, copper foil, or stainless steel foil as a base material.

The coating liquid can be applied on the surface of the base material by various coating methods such as, for example, gravure coating, gravure reverse coating, roll coating, Meyer bar coating, blade coating, knife coating, air knife coating, comma coating, slot die coating, slide die coating, dip coating, extrusion coating, spray coating, and brush coating. The coating film can be formed in such a way that the coating liquid is applied so that the film thickness after drying may be preferably 0.1 to 100 µm, more preferably 0.1 to 50 µm, and particularly preferably 0.1 to 20 µm, and the applied coating liquid is then heated and dried. In addition, it is difficult to apply the coating liquid so that the film thickness after drying may be less than 0.1 µm in many cases. On the other hand, when the film thickness after drying exceeds 100 µm, the flexibility of the coating film may be lowered.

The coating film can be formed by heating and drying the applied film formed on the surface of the base material. It is preferable that heating and drying be conducted preferably at 80° C. or higher for 1 second or longer, and more preferably at 80 to 250° C. for 1 second to 60 minutes. Under such a condition of heating and drying, the polymers such as the hydrophilic polymer and PVDF can sufficiently be crosslinked, and the adhesiveness of the coating film to be formed to the base material and the electrochemical stability of the coating film can be improved. In addition, when the condition of heating and drying is lower than 80° C. or less than 1 second, the adhesiveness of the coating film to the base material and the electrochemical stability of the coating film may be insufficient.

The coating liquid according to the present invention containing an electrically conductive material is useful as a material for forming an electrically conductive coating film for an electrode plate that constitutes an electrical storage apparatus such as a secondary battery or capacitor. In the case where an electrically conductive coating film is formed, a coating film is first formed by applying the coating liquid according to the present invention containing an electrically conductive material on the surface of a collector. It is preferable that the film thickness of the coating film be 0.1 to 10 µm, more preferably 0.1 to 5 µm, and particularly preferably 0.1 to 2 µm. An electrode plate for an electrical storage apparatus, having a small electrical resistance between an electrode layer and a collector and having less environmental load can be produced by forming an electrode layer such as a positive electrode layer for a battery, a negative electrode layer for a battery, or a polarizable electrode for a capacitor on the surface of the formed coating film.

A coating film can be formed on the surface of an article or the like by applying the coating liquid according to the present invention on the surface of the article or the like. Therefore, the coating liquid according to the present invention is useful as a material for forming a water-repellent coating film to be disposed on the surface of an article or the like made of aluminum. A water-repellent coating film that is excellent in water resistance can be formed by applying the coating liquid on the surface of an article or the like so that the film thickness after drying may be, for example, 0.1 to 200 µm, preferably 0.5 to 100 µm, and still more preferably 1 to 50 µm, and then heating and drying the applied coating liquid. A water-repellent coating film that is strongly adhered to the surface of the article or the like can be formed by conducting heating and drying at a temperature of 80° C. or higher.

Controlling the wettability of the surface of an article is an extremely important technique. Specifically, by imparting water repellency to the surface of an article, a lot of functionalities such as an antifog property, a draining property, a frosting/defrosting property are exhibited. For example, when the water repellency on the surface of a structure is enhanced, the adhesion of rain water or the like can be suppressed, so that an antifouling property can be exhibited.

The contact angle with water is used as a general index of evaluating water repellency. As the contact angle becomes larger, the surface free energy becomes smaller and water repellency becomes higher. For example, as the contact angle of the surface of an external wall of a building with water becomes larger, the water repellency becomes higher, so that the rain water or the like becomes hard to adhere. Therefore, it becomes easy to keep the beauty of the building and to reduce the frequency of cleaning.

The contact angle of the coating film according to the present invention measured in accordance with JIS R 3257 is preferably 70° or higher, and a high water-repellency is exhibited. Moreover, when the coating film according to the present invention having a high water-repellency is formed as a primer layer in advance on the surface of a hydrophilic base material such as glass or a metal, the adhesiveness of a hydrophobic polymer such as a fluororesin can be improved in the case where the hydrophobic polymer is applied.

The contact angle of a coating film can be measured according to the method shown below. First, a coating liquid is applied on the surface of an aluminum plate, and then dried at 200° C. for 10 seconds to form a coating film (film thickness after drying of 0.7 µm). The contact angle of the surface of the formed coating film with water is then measured and calculated following a sessile drop method in accordance with JIS R 3257. In the present invention, a contact angle gauge (trade name "Drop Master 100") manufactured by Kyowa Interface Science Co., Ltd. is used, and the contact angle is measured under the condition of 25° C. and a relative humidity of 60%.

<Composite Material and Member for Electrode Plate>

The composite material according to the present invention includes: a base material; and the coating film integrally disposed on the base material. As the base material, metals, glass, natural resins, synthetic resins, ceramics, wood, paper, fibers, nonwoven fabrics, woven fabrics, and leather can be used. That is, a composite material in which the base material and the coating film formed are integrated, the composite material excellent in water repellency, non-tackiness, chemical resistance, a sliding property, electrical conductivity, an antifungal/antimicrobial property, texture, an antifog property, paper strength, stainability, water resistance, and an antifouling property is provided by using the coating liquid according to the present invention. Particularly, the composite material from which a coating film is formed on a base material made of a metal such as aluminum, copper, nickel, or stainless steel is useful as a member for an electrode plate that constitutes an electrical storage apparatus.

<Electrode Plate for Electrical Storage Apparatus and Process for Producing Same>

The electrode plate for an electrical storage apparatus according to the present invention includes: the member for an electrode plate; and an electrode layer disposed on the surface of the coating film that constitutes the member for an electrode plate. Specific examples of the electrode plate for an electrical storage apparatus include electrode plates for a capacitor in which an electrode layer is a positive electrode plate containing a positive electrode active material, in which an electrode layer is a negative electrode plate containing a negative electrode active material, and in which an electrode layer is a polarizable electrode.

Among the collectors that constitute the member for an electrode plate, examples of the positive electrode collector include metal foil such as aluminum, tantalum, niobium, titanium, hafnium, zirconium, stainless steel, zinc, tungsten, bismuth, and antimony foil. Among them, the aluminum foil is preferable as the positive electrode collector because it exhibits an excellent corrosion resistance against electrolytic solutions and is lightweight and easily machinable. Examples of the negative electrode collector include metal foil such as copper, stainless steel, and aluminum foil. It is preferable that the thickness of the collector such as metal foil be 5 to 30 µm, and more preferably 8 to 25 µm. The surface of the collector may be treated with a coupling agent such as a silane-based, titanate-based, or aluminum-based coupling agent in advance.

To produce the electrode plate for an electrical storage apparatus according to the present invention, a coating film is first formed by applying a coating liquid on the surface of a collector and then heating and drying the applied coating liquid. It is preferable that the film thickness (thickness after drying) of the coating film be 0.1 to 10 µm, more preferably 0.1 to 5 µm, and particularly preferably 0.1 to 2 µm. When the film thickness of the coating film is less than 0.1 µm, it may be difficult to coat the surface of the collector uniformly. On the other hand, when the film thickness of the coating film exceeds 10 µm, the flexibility of the coating film may be lowered. To apply the coating liquid on the surface of the collector, gravure coating, gravure reverse coating, roll coating, Meyer bar coating, blade coating, knife coating, air knife coating, comma coating, slot die coating, slide die coating, dip coating, and the like can be used.

After applying the coating liquid on the surface of the collector, it is preferable to conduct heating and drying after or while the polar solvent in the coating liquid be removed by heating. It is preferable to set the condition of heating and drying at 100 to 250° C. for 1 second to 60 minutes. By conducting heating and drying, the hydrophilic polymer and PVDF that are binders are sufficiently crosslinked, so that the adhesiveness of the coating film to be formed to the collector and the electrochemical stability of the coating film to be formed to the electrolytic solution can be improved. When the condition of heating and drying is lower than 100° C. or shorter than 1 second, the adhesiveness of the coating film to the collector and the electrochemical stability of the coating film to the electrolytic solution may be insufficient.

The electrode plate for an electrical storage apparatus can be obtained by forming an electrode layer on the surface of the formed coating film. It is preferable to subject the electrode layer to press processing with a metal roll, heat roll, or sheet press machine in order to improve the homogeneity of the electrode to be formed. It is preferable to set the condition of press processing at 500 to 7,500 kgf/cm$^2$. When the condition of press processing is less than 500 kgf/cm$^2$, it may be difficult to improve the homogeneity of the electrode layer. On the other hand, when the condition of press processing exceeds 7,500 kgf/cm$^2$, there is a tendency that damage becomes liable to occur in the electrode plate itself including the collector.

<Electrical Storage Apparatus>

The electrical storage apparatus includes the electrode plate for an electrical storage apparatus and is useful as a secondary battery or a capacitor.

(Secondary Battery)

Among the storage apparatuses according to the present invention, the secondary battery is a nonaqueous electrolytic solution secondary battery prepared using the electrodes (positive electrode plate and negative electrode plate) for an electrical storage apparatus. When a lithium-based nonaqueous lithium ion battery is prepared, a nonaqueous electrolytic solution obtained by dissolving a lithium salt as a solute in an organic solvent or ion liquid is used. Specific examples of the lithium salt contained in the nonaqueous electrolytic solution include: inorganic lithium salts such as $LiClO_4$, $LiBF_4$, $LiPF_6$, $LiAsF_6$, $LiCl$, and $LiBr$; and organic lithium salts such as $LiB(C_6H_5)_4$, $LiN(SO_2CF_3)_2$, $LiC(SO_2CF_3)_3$, $LiOSO_2CF_3$, $LiOSO_2C_2F_5$, $LiOSO_2C_3F_7$, $LiOSO_2C_4F_9$, $LiOSO_2C_5F_{11}$, $LiOSO_2C_6F_{13}$, and $LiOSO_2C_7F_{15}$.

Specific examples of the organic solvent include cyclic esters, chain esters, cyclic ethers, and chain ethers. Specific examples of the cyclic ester include ethylene carbonate, propylene carbonate, butylene carbonate, γ-butyrolactone, vinylene carbonate, 2-methyl-γ-butyrolactone, acetyl-γ-butyrolactone, and γ-valerolactone.

Specific examples of the chain ester include dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl maleates, and alkyl acetates.

Specific examples of the cyclic ethers include tetrahydrofuran, alkyl tetrahydrofurans, dialkyl tetrahydrofurans, alkoxy tetrahydrofurans, dialkoxy tetrahydrofurans, 1,3-dioxolane, alkyl-1,3-dioxolanes, and 1,4-dioxolane. Specific examples of the chain ether include 1,2-dimethoxyethane, 1,2-diethoxyethane, diethyl ether, ethylene glycol dialkyl ethers, diethylene glycol dialkyl ethers, triethylene glycol dialkyl ethers, and tetraethylene glycol dialkyl ethers.

The ionic liquid is a liquid consisting of only ions in a combination of an organic cation and an anion. Specific examples of the organic cation include: dialkyl imidazolium cations such as 1-ethyl-3-methylimidazolium ion; trialkyl imidazolium cations such as 1,2-dimethyl-3-propylimidazolium ion; tetraalkyl ammonium ions such as dimethyl ethyl methoxy ammonium ion; alkyl pyridinium ions such as 1-butylpyridinium ion; dialkyl pyrrolidinium ions such as methyl propyl pyrrolidinium ion; and methyl propyl piperidinium ion.

Specific examples of the anion as a counter ion of the organic cation include $AlCl_4^-$, $PF_6^-$, $PF_3(C_2F_5)_3^-$, $PF_3(CF_3)_3^-$, $BF_4^-$, $BF_2(CF_3)_2^-$, $BF_3(CF_3)^-$, $CF_3SO_3^-$ (TfO; triflate anion), $(CF_3SO_2)_2N^-$ (TFSI; trifluoromethanesulfonyl), $(FSO_2)_2N^-$ (FSI; fluorosulfonyl), and $(CF_3SO_2)_3C^-$ (TFSM).

(Capacitor)

Specific examples of the capacitor among the electrical storage apparatuses according to the present invention include an electric double layer capacitor and a lithium ion capacitor. It is preferable that the content of the hydrophilic polymer in the coating liquid for use in forming a coating film that constitutes an electrode plate for a capacitor be 1 to 40 parts by mass, more preferably 1 to 20 parts by mass, and particularly preferably 2 to 10 parts by mass based on 100 parts by mass of the total amount of the coating liquid. When the amount of the hydrophilic polymer is excessively small, components of the coating film may be liable to drop out from the coating film. On the other hand, when the amount of the hydrophilic polymer is excessively large, the electrically conductive material is completely covered by the hydrophilic polymer, so that there is a tendency that the internal resistance of the electrode plate increases.

Moreover, it is preferable that the content of PVDF in the coating liquid be 0.02 to 20 parts by mass, more preferably 0.05 to 15 parts by mass, and particularly preferably 0.1 to 10 parts by mass based on 100 parts by mass of the total amount of the coating liquid. When the amount of PVDF is excessively small, the adhesiveness of the coating film to the electrode layer becomes liable to be lowered. On the other hand, when the amount of PVDF is excessively large, there is a tendency that the internal resistance of the electrode plate increases.

It is preferable that the polybasic acid be a polybasic acid with 3 valences or more mentioned previously, or an acid anhydride thereof from the viewpoint of the ability to crosslink the hydrophilic polymer used as a binder. It is preferable that the content of the polybasic acid in the coating liquid be 1 to 300 parts by mass, and more preferably 10 to 200 parts by mass based on 100 parts by mass of the total amount of the hydrophilic polymer and PVDF. When the content of the polybasic acid is less than 1 part by mass based on 100 parts by mass of the total amount of the hydrophilic polymer and PVDF, the crosslink density in the crosslinked polymer to be formed becomes lowered. Therefore, with respect to the coating film to be formed, the adhesiveness to the collector, the insolubility, non-swellability, and electrochemical stability to the electrolytic solution may be insufficient. On the other hand, when the content of the polybasic acid exceeds 300 parts by mass based on 100 parts by mass of the total amount of the hydrophilic polymer and PVDF, the flexibility of the coating film layer to be formed may be lowered, and the coating liquid may become disadvantageous from the economical viewpoint.

As an electrically conductive material, it is preferable to use electrically conductive carbon such as acetylene black, Ketjen black, carbon black, a carbon nanofiber, a carbon nanotube, or graphene. By using the electrically conductive carbon as an electrically conductive material, the electrical contact property of the coating film is much more improved. Therefore, the internal resistance of the capacitor to be obtained becomes low, and the capacity density can be increased. The content of the electrically conductive material in the coating liquid is usually 0.1 to 20 parts by mass, and preferably 2 to 15 parts by mass based on 100 parts by mass of the total amount of the coating liquid.

It is preferable that the coating liquid be processed in advance through physical processing means before being applied when necessary. Examples of the physical processing means include processing means using a bead mill, a ball mill, a sand mill, a pigment disperser, a mash crushing machine, an ultrasonic disperser, a homogenizer, a planetary mixer, and a Hobart mixer. Moreover, it is also preferable that the electrically conductive material be mixed in advance using a mixer such as a mash crushing machine, a planetary mixer, a Henschel mixer, or an omni-mixer, and thereafter the solution of the hydrophilic polymer being a binder be added thereto to mix the resultant mixture uniformly. By these processes, a uniform coating liquid can easily be prepared, and a more satisfactory electrode plate for a capacitor can be produced.

For the collector that constitutes the electrode plate for a capacitor, a material having both electrical conductivity and electrochemical durability is used. Metallic materials such as aluminum, titanium, tantalum, stainless steel, gold, and platinum are preferable from the viewpoint of heat resistance, and aluminum and platinum are more preferable. The shape of the collector is not particularly limited; however, a collector in a sheet form, having a thickness of about 0.001 to about 0.5 mm, is usually used.

The method for forming a coating film is not particularly limited, and a coating film can be formed by applying a coating liquid on a collector, and then drying the applied coating liquid. Example of the method for applying the coating liquid include a doctor blade method, a dipping method, a reverse roll method, a direct roll method, a gravure method, an extrusion method, a brush coating method, and spray coating method.

The viscosity of the coating liquid is different depending on the kind of coater and the shape of the coating line, and is usually 10 to 100,000 mPa·s, preferably 50 to 50,000 mPa·s, and still more preferably 100 to 20,000 mPa·s. The amount of the coating liquid to be applied is adjusted so that the film thickness of the coating film to be formed may be usually 0.05 to 100 Jim, and preferably 0.1 to 10 µm.

An electric double layer capacitor or a lithium ion capacitor as the capacitor according to the present invention having the electrode plate can be produced using parts such as the electrode plate, an electrolytic solution, and a separator according to a routine procedure. Specifically, the capacitor can be produced, for example, in such a way that the electrode plates are overlaid through a separator, wound and bent according to the shape of the capacitor, and placed in a container, an electrolytic solution is then injected in the container, and the container is sealed.

It is preferable to use a nonaqueous electrolytic solution obtained by dissolving an electrolyte in an organic solvent as the electrolytic solution. Examples of the electrolyte for an electric double layer capacitor include tetraethylammonium tetrafluoroborate, triethyl monomethyl ammonium tetrafluoroborate, and tetraethylammonium hexafluorophosphate. Examples of the electrolyte for a lithium ion capacitor include lithium salts such as LiI, LiClO$_4$, LiAsF$_6$, LiBF$_4$, and LiPF$_6$.

Examples of the organic solvent that dissolves the electrolyte include: carbonates such as propylene carbonate, ethylene carbonate, and butylene carbonate; lactones such as γ-butyrolactone; sulfolanes; and nitriles such as acetonitrile. Among them, carbonates having a high withstand voltage are preferable. The concentration of the electrolyte in the nonaqueous electrolytic solution is usually 0.5 mol/L or higher, and preferably 0.8 mol/L or higher.

As the separator, micro porous membranes or nonwoven fabrics made of a polyolefin such as polyethylene or polypropylene; porous membranes obtained from a main raw material pulp generally called paper for an electrolytic capacitor can be used. Moreover, the separator may be formed by applying a dispersion in which an inorganic ceramic powder and a resin binder are dispersed in a solvent on an electrode layer and drying the applied dispersion. Furthermore, a solid electrolyte or a gel electrolyte may be used in place of the separator.

EXAMPLES

Hereinafter, the present invention will be described specifically based on Examples; however, the present invention is not limited to these Examples. It is to be noted that the "parts" and "%" in Examples and Comparative Examples are on a mass basis unless otherwise noticed.

Preparation of Coating Liquid

Example I-1

A dispersion liquid was obtained by dispersing 5 parts of hydroxypropyl chitosan and 5 parts of PVDF (trade name "Kynar 741" manufactured by Arkema) in 88 parts of N-methyl-2-pyrrolidone. A coating liquid was prepared by adding 2 parts of pyromellitic acid to the obtained dispersion liquid and then stirring the resultant mixture at 50° C. for 2 hours Examples I-2 to I-22

Coating liquids were prepared in the same manner as in Example I-1 except that the kind and amount (degree of saponification for unmodified polyvinyl alcohols and modified polyvinyl alcohols) of the hydrophilic polymer, the amount of PVDF, the kind and amount of the polybasic acid, and the kind and amount of the polar solvent were changed as shown in Table I-1. In addition, the meanings of abbreviations in Table I-1 are as follows.
NMP: N-methyl-2-pyrrolidone
NEP: N-ethyl-2-pyrrolidone
DMF: N,N-dimethylformamide
DMAc: N,N-dimethylacetoamide
DMMPA: N,N-dimethyl-β-methoxy propionamide
DMBPA: N,N-dimethyl-β-butoxy propionamide

TABLE I-1

| | Hydrophilic polymer | | | PVDF | Polybasic acid | | Polar solvent | |
|---|---|---|---|---|---|---|---|---|
| | Kind | Degree of saponification (mol %) | Parts | Parts | Kind | Parts | Kind | Parts |
| Example I-1 | Hydroxypropyl chitosan | — | 5 | 5 | Pyromellitic acid | 2 | NMP | 88 |
| Example I-2 | Hydroxybutyl chitosan | — | 8 | 2 | Pyromellitic acid | 5 | NEP | 85 |
| Example I-3 | Hydroxybutyl hydroxypropyl chitosan | — | 5 | 5 | — | — | DMF | 90 |
| Example I-4 | Dihydroxypropyl chitosan | — | 1 | 9 | Pyromellitic acid | 1 | NMP | 89 |
| Example I-5 | Dihydroxypropyl chitosan | — | 5 | 5 | Pyromellitic acid | 5 | NMP | 85 |
| Example I-6 | Dihydroxypropyl chitosan | — | 9 | 1 | Pyromellitic acid | 6 | NMP | 84 |
| Example I-7 | Dihydroxypropyl chitosan | — | 9.9 | 0.1 | Pyromellitic acid | 5 | NMP | 85 |
| Example I-8 | Hydroxyehtyl cellulose | — | 8 | 2 | Pyromellitic acid | 4 | DMAc | 86 |
| Example I-9 | Hydroxypropyl cellulose | — | 15 | 5 | Trimellitic acid | 5 | DMAc | 75 |
| Example I-10 | Hydroxyethyl methyl cellulose | — | 5 | 5 | — | — | DMAc | 90 |
| Example I-11 | Hydroxyethyl starch | — | 5 | 5 | Pyromellitic acid | 4 | DMMPA | 86 |
| Example I-12 | Hydroxypropyl starch | — | 5 | 5 | Trimellitic acid | 4 | DMBPA | 86 |
| Example I-13 | Unmodified polyvinyl alcohol | 93 | 5 | 5 | — | — | NMP | 90 |
| Example I-14 | Unmodified polyvinyl alcohol | 88 | 7 | 3 | Pyromellitic acid | 2 | NMP | 88 |
| Example I-15 | Unmodified polyvinyl alcohol | 80 | 9 | 1 | Pyromellitic acid | 3 | NMP | 87 |
| Example I-16 | Cationically modified polyvinyl alcohol | 87 | 9 | 1 | Pyromellitic acid | 3 | NMP | 87 |
| Example I-17 | Acetoacetyl group-modified polyvinyl alcohol | 93 | 9 | 1 | Pyromellitic acid | 3 | NMP | 87 |

TABLE I-1-continued

|  | Hydrophilic polymer | | | PVDF | Polybasic acid | | Polar solvent | |
|---|---|---|---|---|---|---|---|---|
|  | Kind | Degree of saponification (mol %) | Parts | Parts | Kind | Parts | Kind | Parts |
| Example I-18 | Caboxy group-modified polyvinyl alcolol | 94 | 9 | 1 | Pyromellitic acid | 3 | NMP | 87 |
| Example I-19 | Sulfonate group-modified polyvinyl alcohol | 47 | 9 | 1 | Pyromellitic acid | 3 | NMP | 87 |
| Example I-20 | Silanol-modified polyvintl alcohol | 98 | 9 | 1 | Pyromellitic acid | 3 | NMP | 87 |
| Example I-21 | Hydroxyethyl cellulose | — | 5 | — | Pyromellitic acid | 3 | NMP | 92 |
| Example I-22 | — | — | — | 10 | — | — | NMP | 90 |

Preparation and Evaluation of Electrically Conductive Coating Liquid and Electrically Conductive Coating Film Example 1

(1) Electrically Conductive Coating Liquid

An electrically conductive coating liquid was prepared by blending 6 parts of acetylene black and 94 parts of the coating liquid of Example I-1 and stirring and mixing the resultant mixture using a planetary mixer at a number of revolutions of 60 rpm for 120 minutes.

(2) Electrically Conductive Coating Film

The prepared electrically conductive coating liquid was applied on one face of aluminum foil (collector) having a thickness of 20 μm using a comma roll coater. The applied electrically conductive coating liquid was heated and dried in an oven at 110° C. for 2 minutes and then further heated and dried in an oven at 180° C. for 2 minutes, thereby forming an electrically conductive coating film having a film thickness of 1 μm on one face of the collector.

(3) Adhesiveness

On the formed electrically conductive coating film, 11 parallel lines were drawn at an interval of 1 mm with a cutter and other 11 parallel lines were drawn at an interval of 1 mm perpendicular to the former 11 parallel lines to form 100 squares within an area of 1 cm². A mending tape was attached on the surface of the electrically conductive coating film on which the squares were formed. When the mending tape was peeled off, the number of squares that were not peeled off (average value of 10 tests) was determined to use as an index of the adhesiveness of the electrically conductive coating film to the collector. The results are shown in Table I-2.

(4) Surface Resistivity

The prepared electrically conductive coating liquid was applied on a PET film using a comma roll coater and then dried in an oven at 180° C. for 5 minutes to form an electrically conductive coating film (film thickness after drying of 4 μm) on the PET film. The surface resistivity of the formed electrically conductive coating film was measured by a four-point probe method in accordance with JIS K 7194. The result is shown in Table I-2. In addition, the measurement of the surface resistivity by the four-point probe method was conducted with "Loresta-GP, MCP-T610", trade name, manufactured by Mitsubishi Chemical Analytech Co., Ltd. under the condition of 25° C. and a relative humidity of 60%.

Examples 2 to 20 and Comparative Examples 1 to 2

Electrically conductive coating liquids were prepared and electrically conductive coating films were formed in the same manner as in Example 1 except that the kind and amount of the coating liquid and the kind and amount of the filler (electrically conductive material) were changed as shown in Table I-2. Moreover, the evaluation of the adhesiveness and the measurement of the surface resistivity were conducted in the same manner as in Example 1. The results are shown in Table I-2. In addition, the meanings of the abbreviations in Table I-2 are shown below.

AB: acetylene black (trade name "Denka Black HS-100", manufactured by Denka Company Limited)

KB: Ketjen black (trade name "ECP 600 JD", manufactured by Lion Corporation)

FB: furnace black (trade name "Toka Black #4500", manufactured by Tokai Carbon Co., Ltd.)

CNT: carbon nanotube (manufactured by Tokyo Chemical Industry Co., Ltd., multilayer type, diameter of 40 to 60 nm, length of 1 to 2 μm)

TABLE I-2

|  | Coating liquid | | Filler (Electrically conductive material) | | Adhesiveness (Number (Average value)) | Surface resistivity ($\Omega/$) |
|---|---|---|---|---|---|---|
|  | Kind | Parts | Kind | Parts | | |
| Example 1 | Example I-1 | 94 | AB | 6 | 99.9 | 1040 |
| Example 2 | Example I-2 | 95 | AB | 5 | 100 | 1850 |
| Example 3 | Example I-3 | 93 | AB | 7 | 98.5 | 840 |
| Example 4 | Example I-4 | 95 | AB | 5 | 90.2 | 1260 |
| Example 5 | Example I-5 | 94 | AB | 6 | 100 | 1510 |
| Example 6 | Example I-6 | 95 | AB | 5 | 99.2 | 2120 |
| Example 7 | Example I-7 | 95 | AB | 5 | 100 | 1990 |
| Example 8 | Example I-8 | 92 | AB | 8 | 98.7 | 1130 |
| Example 9 | Example I-9 | 93 | AB | 7 | 100 | 1880 |
| Example 10 | Example I-10 | 90 | AB | 10 | 97.4 | 620 |
| Example 11 | Example I-11 | 94 | AB | 6 | 99.1 | 1470 |
| Example 12 | Example I-12 | 95 | AB | 5 | 100 | 1750 |
| Example 13 | Example I-13 | 94 | AB | 6 | 96.8 | 1070 |
| Example 14 | Example I-14 | 96 | KB | 4 | 100 | 990 |
| Example 15 | Example I-15 | 93 | FB | 7 | 96.5 | 1240 |
| Example 16 | Example I-16 | 98 | CNT | 2 | 100 | 1120 |
| Example 17 | Example I-17 | 95 | AB | 5 | 99.3 | 1610 |
| Example 18 | Example I-18 | 95 | AB | 5 | 100 | 1380 |
| Example 19 | Example I-19 | 95 | AB | 5 | 100 | 1450 |
| Example 20 | Example I-20 | 95 | AB | 5 | 100 | 1290 |
| Cpmparative Example 1 | Example I-21 | 95 | AB | 5 | 97.1 | 1070 |
| Comparative Example 2 | Example I-22 | 95 | AB | 5 | 45.5 | 1210 |

Application to Battery

Example 21

(1) Positive Electrode Plate

The electrically conductive coating liquid of Example 1 was applied on one face of aluminum foil (collector) having a thickness of 20 µm using a comma roll coater. The applied electrically conductive coating liquid was heated and dried in an oven at 110° C. for 2 minutes and then further heated and dried in an oven at 180° C. for 2 minutes, thereby forming an electrically conductive coating film having a film thickness of 1 µm on one face of the collector.

Ninety parts of a LiCoO$_2$ powder (particle diameter of 1 to 100 µm), 5 parts of acetylene black, and 50 parts of an NMP solution containing 5% of PVDF (solution of PVDF) were mixed. The resultant mixture was stirred and mixed using a planetary mixer at a number of revolutions of 60 rpm for 120 minutes to obtain a positive electrode liquid in a slurry form containing a positive electrode active material. The obtained positive electrode liquid was applied on the surface of the electrically conductive coating film using a comma roll coater, and the applied positive electrode liquid was then heated and dried in an oven at 110° C. for 2 minutes. Further, the solvent was removed through drying in an oven at 180° C. for 2 minutes to form an electrode layer (positive electrode active material layer) having a film thickness after drying of 100 µm on the surface of the electrically conductive coating film. The electrode layer was pressed at a pressure of 5,000 kgf/cm$^2$ to make the film thickness uniform, and thereafter aging was conducted in a vacuum oven at 80° C. for 48 hours to remove volatile components (water, solvent, and the like) sufficiently, thereby obtaining a positive electrode plate.

(2) Negative Electrode Plate

The electrically conductive coating liquid of Example 1 was applied on one face of copper foil (collector) using a comma roll coater. The applied electrically conductive coating liquid was heated and dried in an oven at 110° C. for 2 minutes and then further heated and dried in an oven at 180° C. for 2 minutes, thereby forming an electrically conductive coating film having a film thickness of 1 µm on one face of the collector.

Ninety parts of a carbon powder obtained by thermally decomposing coke at 1200° C., 5 parts of acetylene black, and 50 parts of an NMP solution containing 5% of PVDF (solution of PVDF) were mixed. The resultant mixture was stirred and mixed using a planetary mixer at a number of revolutions of 60 rpm for 120 minutes to obtain a negative electrode liquid in a slurry form containing a negative electrode active material. The obtained negative electrode liquid was applied on the surface of the electrically conductive coating film using a comma roll coater, and the applied negative electrode liquid was then heated and dried in an oven at 110° C. for 2 minutes. Further, the solvent was removed through drying in an oven at 180° C. for 2 minutes to form an electrode layer (negative electrode active material layer) having a film thickness after drying of 100 µm on the surface of the electrically conductive coating film. The electrode layer was pressed at a pressure of 5,000 kgf/cm$^2$ to make the film thickness uniform, and thereafter aging was conducted in a vacuum oven at 80° C. for 48 hours to remove volatile components (water, solvent, and the like) sufficiently, thereby obtaining a negative electrode plate.

(3) Battery

The obtained positive electrode plate and negative electrode plate were spirally wounded through a separator made of a polyolefin-based (polypropylene, polyethylene, or a copolymer thereof) porous film having a three-dimensional pore structure (spongiform) and being wider than the positive electrode plate to prepare an electrode body. The prepared electrode body was inserted in a bottomed cylindrical stainless steel container that also functions as a negative electrode terminal. An electrolytic solution obtained by dissolving 1 mol of LiPF$_6$ as a supporting electrolyte in a mixed solvent prepared so that the total amount might be 1 L with a ratio of EC (ethylene carbonate): PC (propylene carbonate):DME (dimethoxyethane)=1:1:2 (volume ratio) was injected into the container to prepare a battery with a size of AA and a rated capacity of 500 mAh.

(4) Charge-Discharge Capacity Maintenance Rate

The charge-discharge capacity maintenance rate of the battery prepared under a temperature condition of 25° C. was measured and calculated using a charge-discharge measuring apparatus. Twenty batteries as one set for a test were charged at a current value of 0.2 CA in terms of a charging current until the battery voltage reached 4.1 V from the charging direction. After 10 minutes of an interval, the batteries were discharged at the same current until the battery voltage reached 2.75 V. After 10 minutes of an interval, the charge-discharge was repeated 100 cycles under the same condition to evaluate the charge-discharge property. The charge-discharge capacity value after 100 cycles (charge-discharge capacity maintenance rate) when the charge-discharge capacity value after 1 cycle is assumed to be 100% was 98%.

Examples 22 to 26 and Comparative Examples 3 to 4

Positive electrode plates, negative electrode plates, and batteries were prepared in the same manner as in Example 21 except that electrically conductive coating liquids shown in Table I-3 were used. Moreover, the charge-discharge capacity maintenance rates were measured and calculated in the same manner as in Example 21. The results are shown in Table I-3.

TABLE I-3

| | Kind of electrically conductive coating liquid used for preparing electrode plate | | Charge-discharge capacity maintainance |
|---|---|---|---|
| | Positive electrode plate | Negative eleccrtode plate | rate (%) |
| Example 21 | Example 1 | Example 1 | 98 |
| Example 22 | Example 2 | Example 2 | 98 |
| Example 23 | Example 3 | Example 3 | 97 |
| Example 24 | Example 5 | Example 5 | 99 |
| Example 25 | Example 9 | Example 9 | 97 |
| Example 26 | Example 14 | Example 14 | 98 |
| Comparative Example 3 | Comparative Example 1 | Comparative Example 1 | 92 |
| Comparative Example 4 | Comparative Example 2 | Comparative Example 2 | 83 |

Application to Capacitor

Example 27

The electrically conductive coating liquid of Example 1 was applied on one face of aluminum foil (collector) having a thickness of 20 µm using a comma roll coater. The applied electrically conductive coating liquid was heated and dried in an oven at 110° C. for 2 minutes and then further heated and dried in an oven at 180° C. for 2 minutes, thereby forming an electrically conductive coating film having a film thickness of 0.5 µm on one face of the collector.

In a planetary mixer, 100 parts of high-purity activated carbon powder having a specific surface area of 1,500 m²/g and an average particle diameter of 10 µm and 8 parts of acetylene black were placed. An NMP solution containing 5% of PVDF (solution of PVDF) was added thereto so that the solid concentration of the resultant mixture might be 45% and the resultant mixture was mixed for 60 minutes. The mixture was diluted with NMP so that the solid concentration might be 42% and was further mixed for 10 minutes to obtain an electrode liquid. The obtained electrode liquid was applied on the electrically conductive coating film using a doctor blade, and the applied electrode liquid was then dried using a fan dryer at 80° C. for 30 minutes. Thereafter, the dried product was pressed using a roll press machine to obtain a polarizable electrode plate for a capacitor, the electrode plate having a thickness of 80 µm and a density of 0.6 g/cm³.

The obtained polarizable electrode plate was cut to make two pieces of circular polarizable electrode plates each having a diameter of 15 mm, and the resultant plates were dried at 200° C. for 20 hours. The electrode layer faces of the two pieces of polarizable electrode plates were disposed to be opposed to each other, a circular cellulose separator having a diameter of 18 mm and a thickness of 40 µm was then inserted therebetween, and the electrode plates and separator were housed in a coin type stainless steel outer container (diameter of 20 mm, height of 1.8 mm, and thickness of stainless steel of 0.25 mm) provided with a polypropylene packing. An electrolytic solution was injected into the coin type outer container so that the air might not remain in the container, thereafter the outer container was covered, fixed, and sealed with a stainless steel cap having a thickness of 0.2 mm through the packing, thereby preparing a capacitor having a diameter of 20 mm and a thickness of about 2 mm. In addition, as the electrolytic solution, a solution obtained by dissolving tetraethylammonium tetrafluoroborate in propylene carbonate so that the concentration might be 1 mol/L was used. The electrostatic capacitance and internal resistance of the prepared capacitor were measured at a current density of 20 mA/cm² and evaluated according to the evaluation criteria shown below. The results are shown in Table I-4.

[Evaluation Criteria of Electrostatic Capacitance]
A: Electrostatic capacitance is larger than that in Comparative Example 5 by 20% or more.
B: Electrostatic capacitance is larger than that in Comparative Example 5 by 10% or more and less than 20%.
C: Electrostatic capacitance is equal to or less than that in Comparative Example 5.

[Evaluation Criteria of Internal Resistance]
A: Internal resistance is smaller than that in Comparative Example 5 by 20% or more.
B: Internal resistance is smaller than that in Comparative Example 5 by 10% or more and less than 20%.
C: Internal resistance is equal to or less than that in Comparative Example 5.

Examples 28 to 32

Capacitors were prepared in the same manner as in Example 27 except that the electrically conductive coating liquids shown in Table I-4 were used. Moreover, the electrostatic capacitance and internal resistance were measured and evaluated in the same manner as in Example 27. The results are shown in Table I-4.

Comparative Example 25

A capacitor was prepared in the same manner as in Example 27 except that the electrically conductive coating liquid shown in Table I-4 was used. Moreover, the electrostatic capacitance and internal resistance were measured and evaluated in the same manner as in Example 27 and was used as a standard for evaluating the electrostatic capacitance and internal resistance of the capacitors of Examples 27 to 32.

TABLE I-4

|  | Kind of electrically conductive coating liquid used for preparing polarizable electrode plate | Electrostatic capacitance | Internal resistance |
| --- | --- | --- | --- |
| Example 27 | Example 1 | A | A |
| Example 28 | Example 4 | B | B |
| Example 29 | Example 8 | A | A |
| Example 30 | Example 10 | A | A |
| Example 31 | Example 15 | B | B |
| Example 32 | Example 20 | A | A |
| Comparative Example 5 | Comparative Example 2 | — | — |

Application to Surface Modification of Hydrophilic Base Material to Make Hydrophobic Surface Example 33

(1) Formation of Coating Film

The coating liquid of Example I-1 was applied on the surface of a glass plate (100 mm×100 mm) having a plate thickness of 1 mm using a bar coater (No. 12) so that the amount of film after drying might be 4 g/m². The glass plate on which the coating liquid was applied was heated and dried under the drying condition shown in Table II-1 to obtain a sample material such that a coating film is formed on the glass plate.

(2) Adhesiveness

On the formed coating film, 11 parallel lines were drawn at an interval of 1 mm with a cutter and other 11 parallel lines were drawn at an interval of 1 mm perpendicular to the former 11 parallel lines to form 100 squares within an area of 1 cm². A mending tape was attached on the surface of the coating film on which the squares were formed. When the mending tape was peeled off, the number of squares that were not peeled off (average value of 10 tests) was determined to use as an index of the adhesiveness of the coating film to the hydrophilic base material. The results are shown in Table II-1

(3) Contact Angle

On the surface of the coating film made of the sample material that was kept in a horizontal state, 2 µL of pure water was dropped. The contact angle of the water droplet was measured using a contact angle gauge (trade name "Drop Master 100" manufactured by Kyowa Interface Science Co., Ltd.) in accordance with JIS R 3257. The result is shown in Table II-1.

Examples 34 to 52, Comparative Examples 6 to 7, and Reference Example 1

Coating films were formed in the same manner as in Example 33 except that the coating liquids shown in Table II-1 were used. Moreover, the evaluation of the adhesiveness and the measurement of the contact angle were conducted in the same manner as in Example 33. The results are shown in Table II-1.

TABLE II-1

| | Coating liquid | Drying condition Temperature (° C.) | Drying condition Time (min) | Adhesiveness (Number (average value)) | Contact angle (°) |
|---|---|---|---|---|---|
| Example 33 | Example I-1 | 200 | 1 | 100 | 87 |
| Example 34 | Example I-2 | 200 | 1 | 100 | 77 |
| Example 35 | Example I-3 | 200 | 1 | 99.3 | 87 |
| Example 36 | Example I-4 | 200 | 1 | 92.5 | 89 |
| Example 37 | Example I-5 | 200 | 1 | 100 | 86 |
| Example 38 | Example I-6 | 180 | 3 | 100 | 75 |
| Example 39 | Example I-7 | 180 | 3 | 100 | 71 |
| Example 40 | Example I-8 | 180 | 3 | 100 | 78 |
| Example 41 | Example I-9 | 180 | 3 | 100 | 79 |
| Example 42 | Example I-10 | 180 | 3 | 98.9 | 85 |
| Example 43 | Example I-11 | 150 | 5 | 100 | 84 |
| Example 44 | Example I-12 | 150 | 5 | 100 | 86 |
| Example 45 | Example I-13 | 150 | 5 | 98.6 | 85 |
| Example 46 | Example I-14 | 130 | 10 | 100 | 82 |
| Example 47 | Example I-15 | 130 | 10 | 100 | 77 |
| Example 48 | Example I-16 | 130 | 10 | 100 | 75 |
| Example 49 | Example I-17 | 100 | 30 | 100 | 74 |
| Example 50 | Example I-18 | 100 | 30 | 100 | 76 |
| Example 51 | Example I-19 | 80 | 60 | 100 | 77 |
| Example 52 | Example I-20 | 80 | 60 | 100 | 80 |
| Comparative Example 6 | Example I-21 | 180 | 3 | 100 | 37 |
| Comparative Example 7 | Example I-22 | 180 | 3 | 34.5 | 90 |
| Reference Example 1 | Example I-5 | 60 | 60 | 68.1 | 87 |

As shown in Table II-1, the coating films of Examples 33 to 52 exhibited a satisfactory adhesiveness to the glass plate being a hydrophilic base material and a sufficiently high hydrophobicity on the surface of the glass plate. On the other hand, the coating film of Comparative Example 6 exhibited a satisfactory adhesiveness to the glass plate; however, the hydrophobicity of the surface was insufficient. Moreover, the coating film of Comparative Example 7 exhibited a sufficiently high hydrophobicity on the surface; however, the adhesiveness to the glass plate was insufficient. In addition, with respect to the coating film of Reference Example 1, the adhesiveness to the glass plate was insufficient.

INDUSTRIAL APPLICABILITY

The coating liquid according to the present invention is useful as a material for producing: a coating film to which various functions such as electrical conductivity and water repellency are imparted; a composite material including the coating film to which such functions are imparted; an electrode plate for an electrical storage apparatus such as a battery or capacitor, the electrode plate being excellent in various properties; and an electrical storage apparatus including the electrode plate for an electrical storage apparatus.

The invention claimed is:

1. A coating liquid comprising:
a polar solvent;
a hydrophilic polymer; and
polyvinylidene fluoride
wherein the hydrophilic polymer is at least one material selected from the group consisting of hydroxyalkyl chitosans and modified polyvinyl alcohols.

2. The coating liquid according to claim 1, wherein the polar solvent is at least one material selected from the group consisting of N,N-dimethylformamide, N,N-dimethylacetoamide, N-methyl-2-pyrrolidone, N-ethyl-2-pyrrolidone, and β-alkoxypropionamides.

3. The coating liquid according to claim 1, wherein:
the hydroxyalkyl chitosan is at least one material selected from the group consisting of hydroxyethyl chitosan, hydroxypropyl chitosan, hydroxybutyl chitosan, and dihydroxypropyl chitosan; and
the modified polyvinyl alcohol is at least one material selected from the group consisting of carboxy group-modified polyvinyl alcohols, carbonyl group-modified polyvinyl alcohols, silanol group-modified polyvinyl alcohols, amino group-modified polyvinyl alcohols, cationically modified polyvinyl alcohols, sulfonate group-modified polyvinyl alcohols, and acetoacetyl group-modified polyvinyl alcohols.

4. The coating liquid according to claim 1, further comprising a polybasic acid.

5. The coating liquid according to claim 1, further comprising at least one electrically conductive material selected from the group consisting of acetylene black, Ketjen black, graphite, furnace black, single layer carbon nanofibers, multilayer carbon nanofibers, single layer carbon nanotubes, multilayer carbon nanotubes, and graphene.

6. A coating film formed of the coating liquid according to claim 1.

7. The coating film according to claim 6, having a contact angle in a range of 70° or more measured in accordance with JIS R 3257.

8. A process for forming a coating film, the process comprising a step of heating the coating liquid according to claim 1 to a temperature in a range of 80° C. or higher.

9. A composite material comprising:
a base material; and
the coating film according to claim 6 disposed on the base material integrally therewith.

10. The composite material according to claim 9, wherein the base material is at least one material selected from the group consisting of metals, glass, natural resins, synthetic resins, ceramics, wood, paper, fibers, nonwoven fabrics, woven fabrics, and leather.

11. A member for an electrode plate, the member comprising:
a collector; and
a coating film being disposed on a surface of the collector and comprising the coating liquid according to claim 5.

12. An electrode plate for an electrical storage apparatus, the electrode plate comprising:
   the member for an electrode plate according to claim 11; and
   an electrode layer being disposed on a surface of the coating film in the member for an electrode plate.

13. The electrode plate for an electrical storage apparatus according to claim 12, wherein:
   the collector in the member for an electrode is aluminum foil, and
   the electrode layer comprises a positive electrode active material.

14. The electrode plate for an electrical storage apparatus according to claim 12, wherein:
   the collector in the member for an electrode is copper foil, and
   the electrode layer comprises a negative electrode active material.

15. The electrode plate for an electrical storage apparatus according to claim 12, wherein:
   the collector in the member for an electrode is aluminum foil, and
   the electrode layer is a polarizable electrode.

16. A process for producing an electrode plate for an electrical storage apparatus, the process comprising:
   applying the coating liquid according to claim 5 on a surface of a collector so as to form a coating film; and
   thereafter forming an electrode layer on a surface of the coating film.

17. An electrical storage apparatus comprising the electrode plate for an electrical storage apparatus according to claim 12.

18. The electrical storage apparatus according to claim 17, being a secondary battery or a capacitor.

* * * * *